(12) United States Patent
Yang et al.

(10) Patent No.: US 11,852,941 B2
(45) Date of Patent: Dec. 26, 2023

(54) CHOLESTERIC LIQUID CRYSTAL DISPLAY DEVICE

(71) Applicant: IRIS OPTRONICS CO., LTD., Tainan (TW)

(72) Inventors: Wu-Chang Yang, Tainan (TW); Hung Tien Chen, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/098,684

(22) Filed: Jan. 18, 2023

(65) Prior Publication Data

US 2023/0229049 A1  Jul. 20, 2023

(30) Foreign Application Priority Data

Jan. 20, 2022 (TW) ................................. 111102306

(51) Int. Cl.
*G02F 1/1362* (2006.01)
*G02F 1/137* (2006.01)

(52) U.S. Cl.
CPC .... *G02F 1/13718* (2013.01); *G02F 1/136209* (2013.01); *G02F 1/136286* (2013.01)

(58) Field of Classification Search
CPC ..................................................... G02F 1/1362
See application file for complete search history.

(56) References Cited

U.S. PATENT DOCUMENTS

| 6,518,944 | B1* | 2/2003 | Doane | G02F 1/13318 345/87 |
| 2003/0081158 | A1* | 5/2003 | Li | G02F 1/13306 349/113 |
| 2016/0043149 | A1* | 2/2016 | Sagardoyburu | G02F 1/1333 349/96 |
| 2020/0218109 | A1* | 7/2020 | Um | G02F 1/133536 |
| 2021/0063831 | A1* | 3/2021 | Zhang | G02F 1/133345 |

FOREIGN PATENT DOCUMENTS

| CN | 106205413 B | 3/2019 |
| CN | 213814208 U | 7/2021 |
| TW | 201217858 A1 | 5/2012 |
| TW | M610279 U | 4/2021 |

* cited by examiner

*Primary Examiner* — Sang V Nguyen
(74) *Attorney, Agent, or Firm* — Cheng-Ju Chiang

(57) ABSTRACT

A cholesteric liquid crystal display device includes a solar cell, a first substrate, a shielding layer, a first electrode layer, a cholesteric liquid crystal layer, a second electrode layer and a second substrate stacked sequentially from bottom to top. The solar cell includes a metal wiring pattern layer. The shielding layer corresponds to the upper side of the metal wiring pattern layer, and is used to reduce the reflection of light from the metal circuit pattern layer. In this way, the cholesteric liquid crystal display device replaces the traditional black absorbing layer with the black material of the solar cell, which can not only absorb light, but also display the image with self-sustaining power. The cholesteric liquid crystal display device shields the arrangement of the metal wiring pattern layer through the shielding layer, which can ensure the image quality of the display panel.

6 Claims, 2 Drawing Sheets

CHOLESTERIC LIQUID CRYSTAL DISPLAY DEVICE

BACKGROUND OF THE INVENTION

1. Field of the Invention

The present invention relates to a liquid crystal display, and in particular, to a cholesteric liquid crystal display device.

2. Description of Related Art

A cholesteric liquid crystal display is one of the liquid crystal displays, and the cholesteric liquid crystal display exhibits a bi-stable characteristic, i.e., the cholesteric liquid crystal display has two stable states without application of electrical field or external electrical energy. It's a striking difference between the cholesteric liquid crystal display and TFT-LCD and LED displays.

The cholesteric liquid crystal molecules have two stable states such as focal conic state and planar state, and their molecular orientation will be maintained without external electrical energy. With application of an external electrical field, the orientation of cholesteric liquid crystal molecule will be switched between these two stable states.

A black adsorbing layer is disposed at the bottom of the cholesteric liquid crystal panel in the prior art. While the orientation of cholesteric liquid crystal molecule is switched to the focal conic state (transparent state), the cholesteric liquid crystal panel will turn dark. Thus, application of the cholesteric liquid crystal panel in the prior art may be limited by external electrical energy.

Therefore, to overcome disadvantages mentioned above, the present invention provides a cholesteric liquid crystal display device.

SUMMARY OF THE INVENTION

The present invention provides a cholesteric liquid crystal display device, utilizing a black material of a solar cell to replace conventionally black absorbing layer to absorb incident light and display image by self-sustaining power. The present invention also utilizes a shielding layer to shield the implementation of a metal wiring pattern so as to ensure image quality of the display panel.

To achieve one or more advantages mentioned above, the present invention provides a cholesteric liquid crystal display device. The cholesteric liquid crystal display device has a solar cell, a first substrate, a shielding layer, a first electrode layer, a cholesteric liquid crystal layer, a second electrode layer, and a second substrate stacked sequentially from bottom to top.

The solar cell has a metal wiring pattern layer, and the shielding layer is disposed between the first substrate and the first electrode layer and corresponds to and over the metal wiring pattern layer so as to lessen the reflectivity of the incident light with respect to the metal wiring pattern layer.

In an embodiment, the cholesteric liquid crystal display device further includes a flattening layer which is filled in the space between adjacent regions of the shielding layer and disposed between the first substrate and the first electrode layer.

In some embodiment of the present invention, the thickness of the flattening layer is larger than or equal to that of the shielding layer.

In other embodiment of the present invention, the cholesteric liquid crystal display device is an active-matrix display.

In other embodiment of the present invention, the cholesteric liquid crystal display device is a passive-matrix display.

In still other embodiment, the shielding layer is made of black material.

In another embodiment, the shielding layer is a black matrix-liked structure.

Therefore, the present invention provides a cholesteric liquid crystal display device, utilizing the black material of the solar cell to replace conventional black absorbing layer so as to absorb the incident light and display the image with self-sustaining power. The present invention uses the shielding layer to shield the metal wiring pattern layer so as to avoid the reflectivity of the incident light with respect to the metal wiring pattern layer and to ensure image quality of the cholesteric liquid crystal display device. Besides, compared to the embodiment indicating that the shielding layer is disposed between the solar cell and the first substrate, while the shielding layer is disposed between the first substrate and the first electrode layer, it is much more effective for manufacturing process and to reduce cost of production.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of "central", "lateral", "up", "down", "right", "left", "upright", "horizontal", "top", "bottom", "inside", and "outside" are used to illustrate the present invention and for clarity. It does not hint or imply that device or part mentioned should be assembled or operated in specific direction or setting. Thus, the terms used herein to describe direction are not limiting. In addition, terms "first", and "second" is for descriptive purpose, and is not construed to or implies amount as described in technical feature of the present invention.

Technical features with limitation terms "first" or "second" would illustrate or imply that one or more technical features can be included. As to detailed description of the present invention, the term "more" indicates two or more unless expressly indicated otherwise.

As to detailed descriptions of the present invention, it will be further explained that the term "assemble", "connected to", "connected" should be construed in broadest way, unless the context clearly indicates otherwise. For example, the term "connected" indicates that two parts may be "fixed connected" or "detachably connected" or "integrally connected". Similarly, the term "connected" also indicates that two parts may be "mechanically connected" or "electrically connected", and "directly connected", "connected by intermediate part" or "internally connected by two parts". Alterations or modifications of the terms mentioned above will be no doubt understood and obvious to those of ordinary skill in the art The terminology used herein is for the purpose of describing embodiments only and is not intended to limit the full scope of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, or components and the like, but do not preclude the presence or addition of one or more other features, integers, steps, operations, elements, components, and/or groups thereof.

Figure 1:
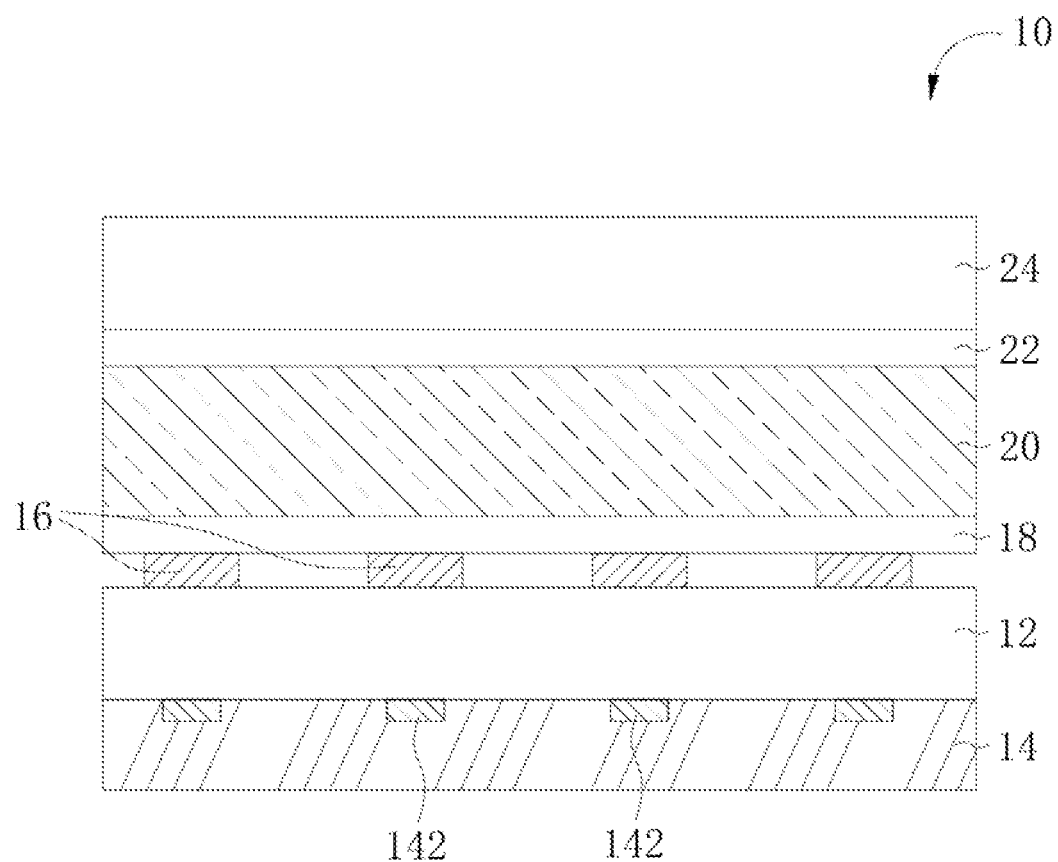
FIG. 1 is a cross section view of a cholesteric liquid crystal display device of the present invention.

Referring to FIG. 1, it illustrates a cross section view of a cholesteric liquid crystal display device 10 of the present invention. To achieve one or more advantages mentioned above, the present invention provides an embodiment of the cholesteric liquid crystal display device 10. As shown in FIG. 1, the cholesteric liquid crystal display device 10 has a solar cell 14, a first substrate 12, a shielding layer 16, a first electrode layer 18, a cholesteric liquid crystal layer 20, a second electrode layer 22, and a second substrate 24 stacked sequentially from bottom to top.

The first substrate 12 and the second substrate 24 are transparent substrates such as glass substrates. The first electrode layer 18 and the second electrode layer 22 apply a proper voltage so that the orientation of the cholesteric liquid crystal molecules of the cholesteric liquid crystal layer 20 have been changed.

A photovoltaic coating is formed on the surface of the solar cell 14 by amorphous silicon (a-Si), polycrystalline silicon or organic electroluminescent material such as dark photovoltaic coating to replace conventional black absorbing layer and provide electrical power to the cholesteric liquid crystal display device 10 which is a self-sustaining display device. Besides, the solar cell 14 has a metal wiring pattern layer 142 to deliver the electrical power from the photovoltaic coating to the electricity output.

The shielding layer 16 is disposed between the first substrate 12 and the first electrode layer 18, and corresponds to and over the metal wiring pattern layer 142. The shielding layer 16 is used to lessen reflectivity of the incident light with respect to the metal wiring pattern layer 142 to prevent the incident light from the metal wiring pattern layer 142 toward the second substrate 24. It may have impact to the image quality of the cholesteric liquid crystal display device 10. In an embodiment, the shielding layer 16 may be made of black material. For example, the shielding layer 16 may be a black matrix-liked structure. In other embodiment, the area of the shielding layer 16 is larger than that of the metal wiring pattern layer 142 so as to fully cover and shield the metal wiring pattern layer 142 and ensure the image quality of the cholesteric liquid crystal display device 10. In still other embedment, a solar paint is deposited on the metal wiring pattern layer 142 so that the shielding layer 16 may be formed and match the solar cell 14 in colors.

In an embodiment, the cholesteric liquid crystal display device 10 may be active-matrix addressed or passive-matrix addressed.

In another embodiment, the solar cell 14 and the first substrate 12 can coexist in one substrate to reduce device's profile and cut costs of production.

Figure 2:
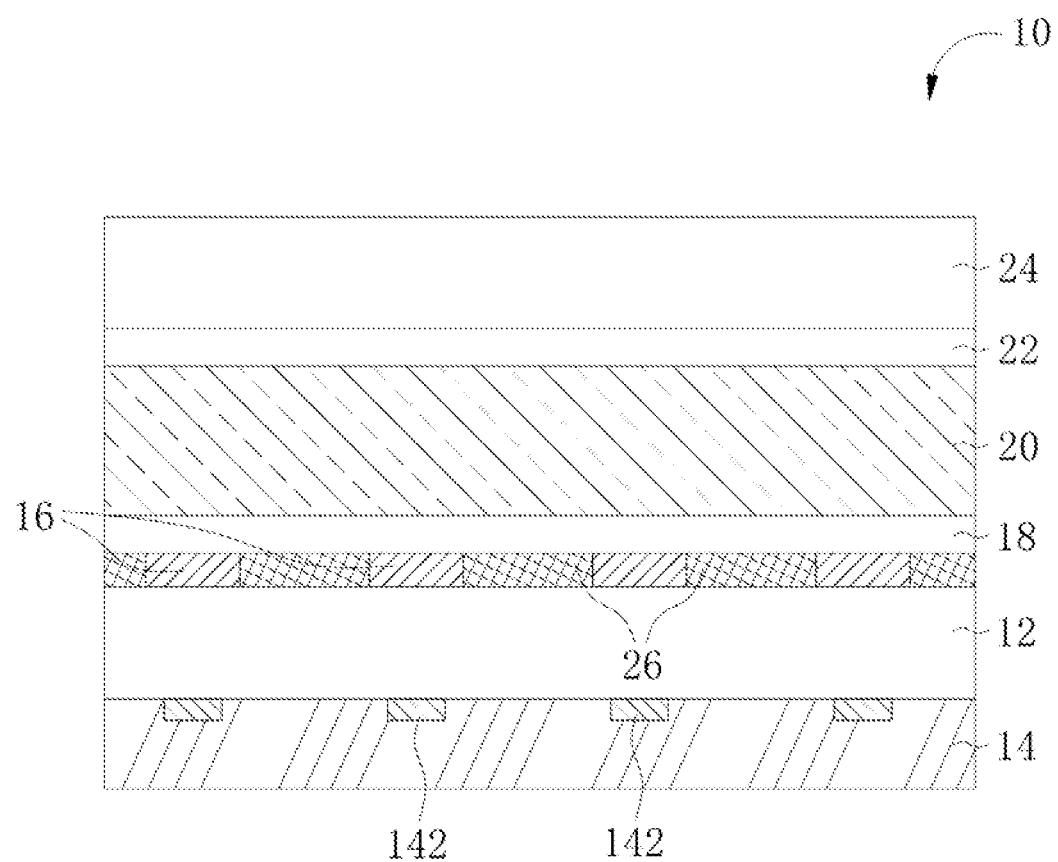
FIG. 2 is cross section view of a cholesteric liquid crystal display device with a flattening layer of the present invention.

According to other embodiment as shown in FIG. 2, the cholesteric liquid crystal display device 10 further includes a flattening layer 26 which is filled in the space between adjacent regions of the shielding layer 16 and disposed between the first substrate 12 and the first electrode layer 18 to strengthen robustness of the structure. Besides, it is helpful for the first electrode layer 18 to be formed at top of the shielding layer 16 and the flattening layer 26. Preferably, the top surfaces of the flattening layer 26 and the shielding layer 16 are in alignment, and the thickness of the flattening layer 26 is larger than or equal to that of the shielding layer 16. The shielding layer 16 can be made of black opaque materials such as black resist, Epoxy, or Acrylic, etc. The flattening layer 26 can be made of transparent materials such as transparent resist, Epoxy, or Acrylic, etc.

Please note that the metal wiring pattern layer 142 of the solar cell 14 has an intersected or parallel structure and has spacing so that the shielding layer 16 corresponding to and above the metal wiring pattern layer 142 does not cover all of the first substrate 12 but just cover the metal wiring pattern layer 142. Thus, there are spaces between adjacent regions of the shielding layer 16.

To sum up, the present invention provides the cholesteric liquid crystal display device 10 utilizing the black material of the solar cell 14 to replace well-known black absorbing layer to absorb incident light and display image by self-sustaining power. The present invention also utilizes the shielding layer 16 to shield the metal wiring pattern layer 142 so as to avoid the reflectivity of the incident light with respect to the metal wiring pattern layer 142 and ensure image quality of the cholesteric liquid crystal display device 10.

Furthermore, compared to the embodiment indicating that the shielding layer 16 is disposed between the solar cell 14 and the first substrate 12, while the shielding layer 16 is disposed between the first substrate 12 and the first electrode layer 18, it is much more effective for manufacturing process and to reduce cost of production.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A cholesteric liquid crystal display device, comprising:
a solar cell, a first substrate, a shielding layer, a first electrode layer, a cholesteric liquid crystal layer, a second electrode layer, and a second substrate stacked sequentially from bottom to top, and a flattening layer which is filled in the space between adjacent regions of the shielding layer and disposed between the first substrate and the first electrode layer;

wherein the solar cell comprises a metal wiring pattern layer; and wherein the shielding layer is disposed between the first substrate and the first electrode layer and corresponds to and over the metal wiring pattern layer so as to lessen the reflectivity of the incident light with respect to the metal wiring pattern layer.

2. The cholesteric liquid crystal display device according to claim 1, wherein the thickness of the flattening layer is larger than or equal to that of the shielding layer.

3. The cholesteric liquid crystal display device according to claim 1, wherein the cholesteric liquid crystal display device is an active-matrix display.

4. The cholesteric liquid crystal display device according to claim 1, wherein the cholesteric liquid crystal display device is a passive-matrix display.

5. The cholesteric liquid crystal display device according to claim 1, wherein the shielding layer is made of black material.

6. The cholesteric liquid crystal display device according to claim 1, wherein the shielding layer is a black matrix-liked structure.

* * * * *